Dec. 31, 1929.                A. G. DAWSON                1,741,979
                   VARIABLE PANEL AND MOLDING RETAINER
                          Filed July 12, 1928
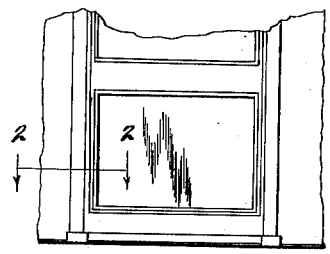
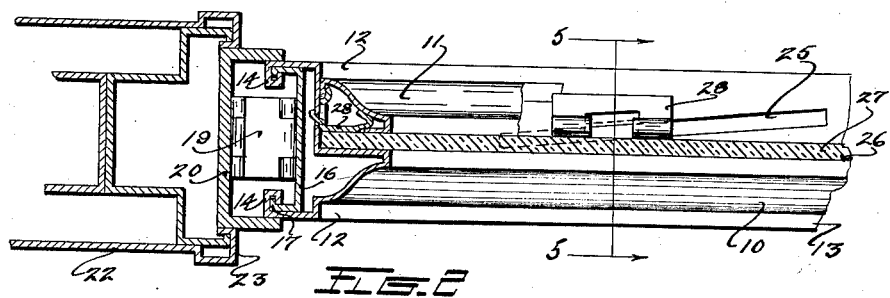
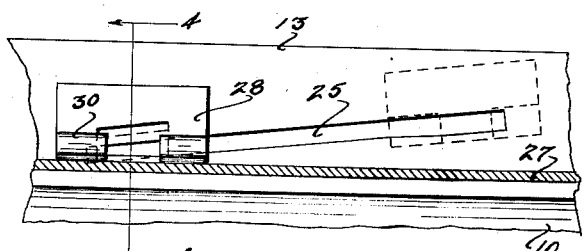     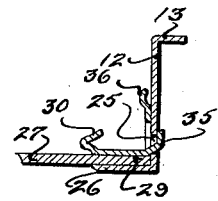
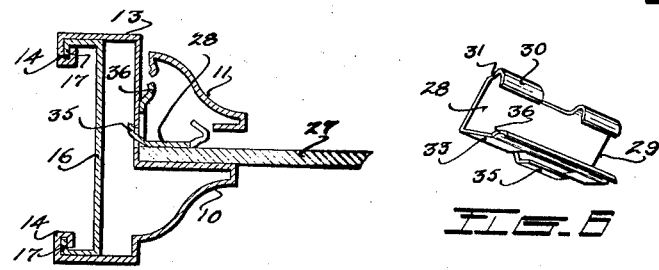
Inventor
Axel G. Dawson
By Clarence S. Walker
His Attorney Patented Dec. 31, 1929

1,741,979

UNITED STATES PATENT OFFICE

AXEL G. DAWSON, OF JAMESTOWN, NEW YORK, ASSIGNOR TO DAHLSTROM METALLIC DOOR COMPANY, OF JAMESTOWN, NEW YORK, A CORPORATION OF NEW YORK

VARIABLE PANEL AND MOLDING RETAINER

Application filed July 12, 1928. Serial No. 292,056.

This invention relates to an improvement in metal partition construction and more particularly to a variable panel and molding retainer therefor.

In its preferred embodiment this invention comprises a plurality of retainers or clips adjustably supported upon the frame and adapted to wedge the panel into close engagement with the rigid molding and also to form a removable molding engaging means.

In order to facilitate a clearer understanding of this invention reference is had briefly to the present day method of mounting panels in partitions. The usual manner of securing a panel in a partition is through the provision of a molding on one face thereof which is fixed to or formed integral with the panel frame and a removable molding which, when the panel is inserted against the fixed molding, is secured to the frame by means of screws. In some instances the frames and removable molding are provided with drilled openings prior to being assembled upon a partition and in other instances the work of drilling and tapping these openings remains until the partition is being assembled.

When the openings are drilled in the molding and frame during manufacture, the panel thickness must have been contemplated. If, when the partition is assembled and as is often the case, it is desired to substitute a one-fourth inch glass panel for one of metal, the openings in the frame will not center with the openings in the molding, thus requiring a new molding or the provision of additional openings by which to secure the molding and panel in place upon the frame. It is well known that there is a commercial leeway or variation in the thickness of a glass panel and a panel presumably of a one-fourth inch thickness may actually vary from three-sixteenths to five-sixteents of an inch. By reason of this variance in the thickness of a panel, it is impossible to accurately drill holes in the frame and molding prior to assembly without the attendant difficulty of having the molding bind upon the glass at one point and be loose at another.

In other instances the manufacturer does not attempt to guess at the proper location of the holes by which to secure the removable molding in place but requires this to be done when the partition is being assembled and the actual variance in thickness of the glass panel is known. The necessary openings are then drilled in the molding and frame and screws secure the molding in place upon the frame. It is obvious that the assembling of a partition is greatly delayed when, before locating each panel, a number of holes must be drilled and tapped in the molding and frame.

Applicant, in order to facilitate quicker and more accurate assembling of partitions has provided adjustable retaining members which are of twofold purpose, namely, to rigidly position a panel within its frame and also to secure a removable molding in close engagement with the panel and frame. By reason of applicant's structure he is enabled not only to accommodate glass panels having a commercial variation in thickness but metal or ply wood panels as well. In as much as there is a wide difference in thickness between metal and glass panels the adaptability of applicant's invention is apparent when, through the use of his construction, a glass panel may be substituted for a metal panel or vice versa without knowledge or regard for the thickness of either panel.

The principal object of this invention is to provide retainers or clips for panels in a partition construction which are adjustable to rigidly secure panels of varying thickness.

Another object of this invention is to provide panel retainers which, regardless of their location upon the frame, due to the panel thickness, will support and retain a removable molding in close proximity with the panel and frame.

A further object of this invention is the provision of retainers to removably secure a panel and molding in place within a partition without the use of screws or bolts.

A still further object of this invention is to provide panel retaining means which is wholly invisible when the molding is in place and which may be readily removed.

Other and further objects of this invention will appear from a consideration of the following specification taken in connection with the accompanying drawing, and in which Fig. 1 is a fragmentary view of a portion of a partition assembly showing the panel and molding in place;

Fig. 2 is a greatly enlarged vertical sectional view taken on the line 2—2 of Fig. 1;

Fig. 3 is a fragmentary vertical view similar to Fig. 2 and illustrates in dotted lines the manner by which the retaining clips may be adjusted to engage panels of various thicknesses;

Fig. 4 is a sectional view taken on the line 4—4 of Fig 3 illustrating the manner of anchoring the retaining clip upon the partition frame;

Fig. 5 is a fragmentary view of a partition, frame, panel and retaining clip, and illustrates the manner by which the removable molding is mounted in close proximity with the panel and frame; and Fig. 6 is a perspective view of one of the retaining clips showing the frame engaging portion and the panel molding engaging flanges.

Referring to the drawing and more particularly to Fig. 2 thereof, the reference numeral 10 designates a fixed molding adjacent which removable molding 11 is located. The molding 10 is provided with outwardly projecting flanges 12 extending substantially the full width of the partition and which constittue the frame 13. The frame 13 terminates in inwardly projecting triple flanges 14. An interlocker reinforcing member 16, having flanges 17, engages the flanges 14 of the frame 13. The member 16 is adapted to prevent the frame 13 from spreading or collapsing when under strain. The frame 13 is pivotally secured to a takeup member 19 which in turn is secured to a channel member 20. The channel member 20 engages the pilaster 22 between the corners 23 thereof. In as much as the construction of the pilaster 22, channel 20, and takeup member 19 form a part of and are claimed in my pending application Serial No. 201,096, no claim thereto is made in this application and further description thereof is unnecessary.

The removable molding 11 is made up of four identical elements secured together at their adjacent corners by welding or other suitable means. The flange 12 of the frame 13 remote from the molding 10 is provided with slots 25 cut at a slight angle to the longitudinal axis of the frame. The slots 25 terminate at their inner ends at the vertical wall 26 of the molding 10 and are usually covered by the panel 27 when said panel is in position upon the frame. Retainers or clips 28, of which there is one for each slot 25, are each provided with a face 29 which terminates in a curved portion 30 offset from the face 29 by the shoulder 31. The clip 28, has a base wall 33 formed at right angles to the face 29 and from which is stamped out a flange 35. The base 33 terminates in a curved flange 36 somewhat similar to the portions 30 of the face 29. The flange 35 is cut and depressed at an angle to the longitudinal axis of the clip 28, the angle being the same as that of the slot 25 provided therefore in the frame 13. The clip 28 is adapted to engage the frame 13 through the slot 25 by means of the flange 35 and may be freely moved from one end of the slot to the other during which movement the face 29 thereof is parallel to the vertical wall of the molding 10.

When the panel 27 is placed in the frame 13 against the wall 26 of the fixed molding 10, the clips 28 are placed in engagement with the slots 25, being slid along the slot until they are in a position such that the face 29 thereof abuts and closely engages the panel 27. The clips 28 act, when forced into engagement with the panel 27, as wedges to retain the panel in close and fixed engagement with the wall 26 of the molding 10. As above stated, the glass panels are subject to a commercial variance in thickness of approximately an eighth of an inch and a panel having such variance will be as firmly secured against the wall 26 of the molding 10 by means of the clips 28 as would a metal or ply wood panel having no variance in thickness throughout its length. Since it makes little or no difference the position occupied by one clip with relation to that of the others, each clip will independently engage the panel to firmly retain it within the frame 13. Any panel from the merest fraction of an inch in thickness up to approximately five-sixteenths of an inch, which includes practically every thickness of panel used in partition construction may be mounted through the use of clips 28. After the panel 27 has been place within the frame and the clips 28 have been brought into close engagement therewith, the removable molding 11, shaped to conform to the size of the panel, is brought into engagement with the clips 28. The molding 11 along its inner edge is provided with a curved flange 40 which engages the flanged portions 30 of the clips 28. The outer portion of the molding 11 is provided with an inwardly extending flange 41 terminating in a ill length curved portion 42 adapted to conform to the contour of the flange 36 of clips 28. By reason of this structure, the molding 11, when forced into engagement with the clips 28, springs into place, the portion 42 engaging the flange 36 and the flange 40 the portion 30. The molding is therefore securely held in place against the panel 27 and the frame 13. Attention is called to the fact that regardless of any variance in thickness of the panel, the molding 11 will be in close engagement therewith since the clips 28 are its only support and said clips abut the panel.

When for any reason it is necessary to remove the panel, any instrument such as a screw driver may be wedged between the flange 12 of the molding 10 and the flange 41 of the molding 11 and with a slight pressure the molding 11 will snap out of engagement with the clips 28. When the molding is freed the clips are moved outwardly following the course of the slots 25 and the panel 27 may be removed.

While only one modification of this invention has been shown and described, applicant does not intend to be limited thereto since it is obvious that other modifications or adaptations may be made without departing from the spirit and scope of this invention as set forth in the following claims.

Having thus set forth my invention what I claim is new and for which I desire protection by Letters Patent is:

1. A removable panel construction comprising a frame provided with a molding on one side thereof, a flange extending from said molding to the opposite side of said frame, said flange having a plurality of slots produced at an angle to the longitudinal axis of said frame, removable and adjustable clips engaging said slots, removable molding engaging said clips and a panel held between said frame molding and said clips.

2. A removable panel construction comprising a frame having a molding formed along one side thereof, a panel adapted to rest within said frame against said molding, a plurality of slots in said frame, said slots being produced at an angle to the longitudinal axis of said frame, clips removably and adjustably engaging said slots, said clips being adapted to force said panel into abutting relation with said molding.

3. A removable panel construction comprising a frame having a molding projecting inwardly therefrom, a panel adapted to be positioned within said frame against said molding, a plurality of slots in said frame, said slots being produced at an angle to the longitudinal axis of said frame, removable clips engaging said slots and said panel and removable means engaging said clips whereby to conceal the panel securing clips from view.

In testimony whereof I have affixed my signature.

AXEL G. DAWSON.